3,411,807
VEHICLE SAFETY ASSEMBLY
Sidney Oldberg, Birmingham, and William R. Carey, Farmington, Mich., assignors to Eaton Yale & Towne, Inc., Cleveland, Ohio, a corporation of Ohio
Filed Mar. 9, 1967, Ser. No. 621,845
5 Claims. (Cl. 280—150)

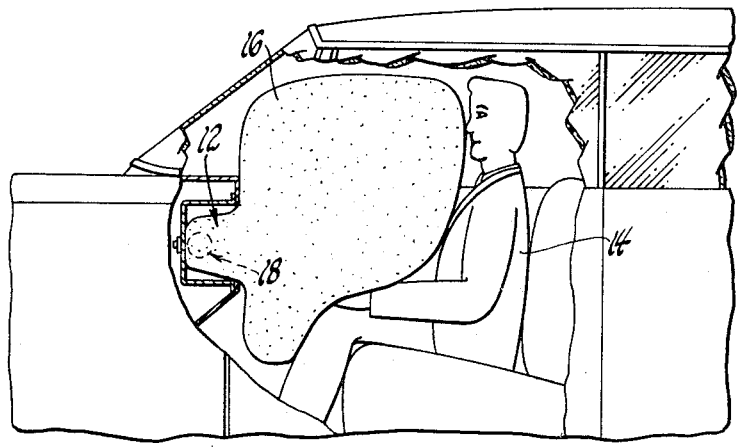
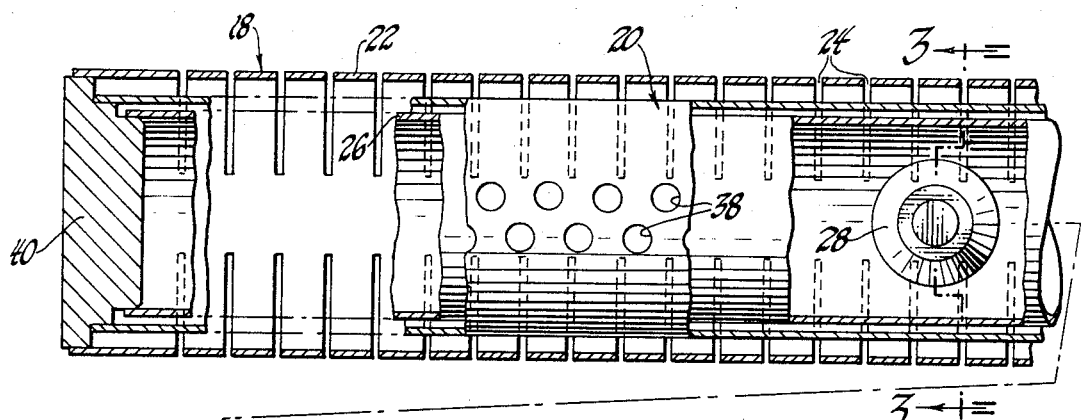
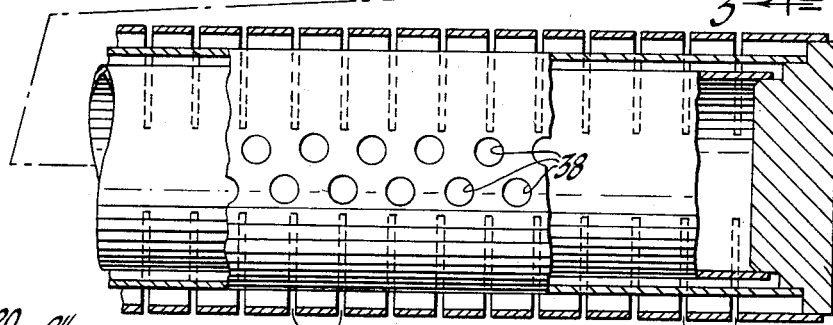
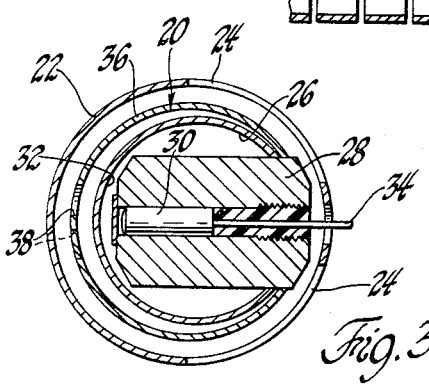
INVENTORS
William R. Carey
BY Sidney Oldberg
ATTORNEYS United States Patent Office 3,411,807
Patented Nov. 19, 1968

ABSTRACT OF THE DISCLOSURE

An assembly for protecting an occupant of a vehicle comprising an inflatable bag, a fluid source in communication with the bag for storing fluid to inflate the bag, and an outer member disposed about the fluid source for controlling the flow of fluid from the fluid source to the bag and wherein the outer member has a plurality of spaced elongated narrow slots through which the fluid from the fluid source flows to prevent the inadvertent rupture of the bag.

---

Recently, a great deal of research and development has occurred in an effort to develop safety systems for vehicles, particularly safety systems for passenger vehicles such as automobiles. One safety system which is being thoroughly investigated is one utilizing an inflatable bag which is automatically inflated in response to a predetermined condition of the automobile to prevent the occupant of the automobile from contacting the instrument panel, windshield, or the like. In other words, the bag is inflated during a crash to prevent the occupant of the automobile from incurring serious injuries as a result of impact with the interior of the vehicle body.

It will be appreciated that the time in which the bag must be inflated is very critical and is measured in terms of milliseconds. Consequently, one of the problems being thoroughly researched is that relating to a means for rapidly inflating the bag. It is elementary as a matter of physical law that the faster a volume of fluid can be injected into the bag, the faster the bag will be inflated. As a practical matter, however, this is not always possible. For example, one of the prior art systems employing an inflatable bag for protecting the occupant of a vehicle utilizes a source of fluid pressure which is fed through a conduit or a pipe to the bag. To inflate the bag in the requisite time, the fluid pressure in the conduit must be very high and consequently the fluid being ejected from the conduit in communication with the bag forms a relatively long jet having a large amount of energy. Such a jet reacts against the bag and unless the bag is made of a very heavy material, the bag will rupture. Of course, if the bag is made of a very heavy material, this inhibits the inflation of the bag due to the mass of the bag which must be moved during inflation. The essence of the problem is, therefore, to very rapidly move fluid from a source and into the bag without rupturing the bag while it is being inflated.

Accordingly, the instant invention provides a solution to this problem in that it has been discovered that a relatively thin walled bag may be rapidly inflated with fluid from a high pressure source when the high pressure source is surrounded by an outer member having a plurality of spaced elongated slots therein through which the fluid flows in moving from the fluid source to the bag.

It is, therefore, an object and feature of this invention to provide a safety assembly adapted for attachment to an automobile and including an inflatable bag in fluid communication with a fluid source having an outer member disposed thereabout with a plurality of spaced elongated slots therein through which the fluid from the fluid source must flow to inflate the bag, it having been discovered that the flow of fluid through such elongated slots significantly reduces and prevents the possibility of the inadvertent rupture of the bag while at the same time allowing the bag to be very rapidly inflated with high pressure fluid.

In general, these and other objects and features of this invention may be attained in a preferred embodiment of an assembly adapted to be attached to a vehicle for protecting an occupant of the vehicle. The assembly includes an inflatable bag, fluid source means in communication with the bag for storing fluid to inflate the bag, and an outer member disposed about the fluid source means. The outer member has a plurality of spaced elongated narrow slots through which the fluid from the fluid source means flows in moving to the bag so as to control the flow of fluid for preventing the inadvertent rupture of the bag as it is being inflated.

Other objects and attendant advantages of the present invention will be readily appreciated as the same becomes better understood by reference to the following detailed description when considered in connection with the accompanying drawings wherein:

FIGURE 1 is a partially broken away fragmentary view of a preferred embodiment of the assembly of the instant invention;

FIGURE 2 is an enlarged cross-sectional view of the fluid source utilized in the assembly of the instant invention; and FIGURE 3 is a cross-sectional view taken substantially along line 3—3 of FIGURE 2.

Referring now to the drawings, wherein like numerals indicate like or corresponding parts throughout the several views, a vehicle is generally shown at 10 in combination with a safety assembly generally shown at 12 for protecting the occupant 14 of the vehicle.

The assembly includes an inflatable bag 16 and a means for inflating the bag, generally shown at 18. The means 18 inflates the bag 16. The bag 16 is normally stowed in a collapsed folded position and an appropriate sensing means is utilized to inflate the bag 16 in the event of a crash or any other predetermined operating condition of the vehicle so as to prevent the occupant 14 from moving forward and impacting against portions of the vehicle, such as the instrument panel and/or the windshield.

The means 18 for inflating the bag is in communication with the bag 16. The means 18 for inflating the bag comprises a fluid source means, generally indicated at 20, and an outer member 22. The fluid source means 20 is in communication with the bag 16 and stores fluid for inflating the bag 16. The outer member 22 is disposed about the fluid source means 20 for controlling the flow of fluid from the fluid source means 20 to the bag 16. More specifically, the outer member 22 has a plurality of spaced elongated narrow slots 24 through which the fluid from the fluid source means 20 flows to inflate the bag 16. The outer member 22 is an elongated cylindrical member and the slots 24 extend substantially transverse to the longitudinal axis thereof.

The fluid source means 20 includes an inner cylindrical container 26 for storing the fluid to inflate the bag 16. A support means 28 is associated with the inner container 26 to support an explosive means 30 for opening the inner container 26 upon the activation thereof. The support means 28 confines and directs the energy resulting from the activation of the explosive means 30 so as to direct the energy against the inner container 26 in the area indicated at 32 for opening the inner container 26 to allow the escape of fluid therefrom. An electrical lead 34 carries an electrical current for activating or detonating the explosive means 30. The configuration and function of the support means 28 and the explosive means 30 is more specifically disclosed and claimed in copending application Ser. No. 622,349 filed on Mar. 10, 1967 and assigned to the assignee of the instant invention.

There is also included a limiting means comprising the intermediate member 36 disposed about the inner container 26 for controlling the opening thereof. As set forth in the above-mentioned copending application, the support means 28 confines and directs the energy of the explosive charge 30 against the inner container 26 in the area 30 so as to open the inner container 26 in the area 30. As the inner container 26 is opened, the portions thereof on either side of the opening move radially outwardly and against the intermediate member 36. Thus, the intermediate member 36 controls such radially outward movement. Since the intermediate member 36 controls the radially outward movement of the inner container 26 upon the opening thereof, the inner container 26 is opened longitudinally therealong substantially from one end to the other. That is to say, one large hole in the midportion of the container 26 might result if the intermediate member 36 were not utilized, but by utilizing the intermediate member 36, the energy of the explosive means is utilized along the entire length of the container 26 to provide an opening extending substantially from one end to the other thereof. The supporting means 28, therefore, forms a means for predetermining the area of the opening of the inner container 26.

The elongated narrow slots 24 are circumferentially spaced from the area 32 of the opening of the inner container 26. The intermediate member 36 has a plurality of outlet openings 38 therein which are circumferentially aligned with the area 32 where the inner container 26 opens as a result of the detonation of the explosive means 30. The outlet openings 38 allow fluid to flow from the inner container 26 longitudinally along the intermediate member 36 upon the activation of the explosive means 30. There is also included the plug means 40 which define the ends of the inner container 26, the intermediate member 36, and the outer member 22.

It will be noted that there are two circumferentially spaced rows of the elongated slots 24 and each row extends longitudinally along the outer member 22. This disposition of the slots 24 is important because the flow of fluid therethrough inflates the bag 16 by moving in many directions over a wide arc; thus, the bag inflates simultaneously in substantially all directions from the outer member 22.

The assembly of the instant invention may be attached to an automobile as disclosed in FIGURE 1. The inner container 26 is charged with a fluid under pressure through an appropriate valve (not shown). The electrical lead 34 is attached to an appropriate sensing device. Any suitable sensing device may be utilized, such as an accelerometer, inertia responsive switch, or the like. An example switch is illustrated in copending application Ser. No. 562,289, filed July 1, 1966 in the names of Sidney Oldberg and William R. Carey and assigned to the assignee of the instant invention. In the event of a crash of the vehicle 10, the sensing means sends a signal to the explosive means 30 to detonate or activate the explosive means 30 whereby the energy resulting therefrom is directed by the support means 28 against the area 30 of the inner container 26 to open the inner container 26 longitudinally therealong at the area 30. When the inner container 26 is opened, the portions thereof on either side of the opening move radially outwardly against the intermediate member 36 as fluid flows therefrom through the outlet openings 38. When fluid flows from the outlet openings 38 of the intermediate member 36, it flows about the intermediate member 36 and through the elongated narrow slots 24 to inflate the bag 16. The pressure of the fluid in the container 26 can be very high; however, it has been discovered that by utilizing the elongated narrow slots 24, the rupture of the bag 16 during the inflation thereof is prevented. In other words, it has been found that by utilizing the elongated narrow slots 24 through which the high pressure fluid must flow to enter the bag 16, a much thinner material may be utilized for the bag 16, yet the bag 16 will not rupture due to the rapid movement of high pressure fluid thereinto.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An assembly adapted to be attached to a vehicle for protecting an occupant of the vehicle, said assembly comprising an inflatable bag, fluid source means in communication with said bag for storing fluid to inflate said bag, and an outer member disposed about said fluid source means for controlling the flow of fluid from said fluid source means to said bag, said outer member having a plurality of spaced elongated narrow slots through which the fluid from said fluid source means flows, said outer member being elongated and said slots extending substantially transverse to the longitudinal axis thereof in two spaced rows with each row extending longitudinally along said outer member, said outer member being cylindrical, said fluid source means including an inner cylindrical container for storing fluid to inflate said bag, support means associated with said inner container for supporting explosive means for opening said inner container upon activation thereof, limiting means disposed about said inner container for controlling said opening thereof, means for predetermining the area of said opening of said inner container, said slots being circumferentially spaced from said area of said opening of said inner container, said limiting means comprising an intermediate cylindrical member disposed about said inner container and being spaced from said area of said opening, said intermediate member having at least one outlet opening therein which is circumferentially aligned with said area of said opening to allow fluid to flow therefrom longitudinally therealong upon the activation of the explosive means, plug means defining the ends of said inner container, said intermediate member, and said outer member, and explosive means supported by said support means within said inner container.

2. An assembly adapted to be attached to a vehicle for protecting an occupant of the vehicle, said assembly comprising an inflatable confinement, fluid source means in communication with said confinement for storing fluid to inflate said confinement, said fluid source means including an inner container for storing fluid to inflate said confinement, an outer member associated with said fluid source means for controlling the flow of fluid from said fluid source means to said confinement, said outer member being elongate and having a longitudinal axis, said outer member having a plurality of spaced elongate narrow slots through which the fluid from said fluid source means flows, said slots extending transverse to the longitudinal axis of said outer member, means associated with said inner container for providing an opening in said inner container upon actuation thereof, limiting means associated with said inner container for controlling said opening thereof, said limiting means comprising an intermediate member disposed between said inner container and outer member, said intermediate member having at least one outlet opening therein which is circumferentially aligned with said opening in said inner container to allow fluid to flow therefrom, said slots being circumferentially spaced from said opening in said inner container.

3. Safety apparatus for protecting an occupant of a vehicle, said safety apparatus comprising a confinement having a collapsed inoperative condition and an expanded operative condition, said confinement when in the operative condition being effective to restrain movement of an occupant of the vehicle during a collision, structure operable to supply fluid for expanding said confinement, means operable to provide for flow of fluid from said structure, and a diffuser member located in the path of flow of fluid from said structure for diffusing and directing said flow to said confinement, said diffuser member having a plurality of spaced apart elongate slots therein through which fluid flows to said confinement, said slots being of a generally rectangular shape disposed within said confinement and operable to distribute flow therethrough into said confinement.

4. Safety apparatus as defined in claim 3 wherein said diffuser member has a longitudinal axis and said elongate slots extend transverse to said longitudinal axis.

5. Safety apparatus as defined in claim 3 wherein said slots are arranged in two spaced rows.

References Cited
UNITED STATES PATENTS

| | | | |
|---|---|---|---|
| 2,834,606 | 5/1958 | Bertrand | 280—150 |
| 2,850,291 | 9/1958 | Ziccardi | 280—150 |
| 3,185,089 | 5/1965 | Parkhurst et al. | 102—24 |
| 3,191,533 | 6/1965 | Hopson | 102—24 |
| 3,197,234 | 7/1965 | Bertrand | 280—150 |

BENJAMIN HERSH, *Primary Examiner.*

J. SIEGEL, *Assistant Examiner.*